(12) United States Patent
Kangatharalingam et al.

(10) Patent No.: US 9,485,979 B1
(45) Date of Patent: Nov. 8, 2016

(54) MULTI-FUNCTION INTEGRAL FISHING TOOL WITH DUAL FISHHOOK REMOVERS, LINE KNOT MAKER, LINE CLIPPER AND HOOK SHARPENER

(71) Applicants: Nallathamby Kangatharalingam, Stillwater, OK (US); Nirmalakanthi Kangatharalingam, Stillwater, OK (US)

(72) Inventors: Nallathamby Kangatharalingam, Stillwater, OK (US); Nirmalakanthi Kangatharalingam, Stillwater, OK (US)

( * ) Notice: Subject to any disclaimer, the term of this patent is extended or adjusted under 35 U.S.C. 154(b) by 110 days.

(21) Appl. No.: 14/446,727

(22) Filed: Jul. 30, 2014

(51) Int. Cl.
*A01K 97/18* (2006.01)

(52) U.S. Cl.
CPC ..................................... *A01K 97/18* (2013.01)

(58) Field of Classification Search
CPC ...... A01K 97/00; A01K 97/18; A01K 97/24; A01K 97/28
See application file for complete search history.

(56) References Cited

U.S. PATENT DOCUMENTS

| | | | | |
|---|---|---|---|---|
| 2,671,979 A | * | 3/1954 | Jones, Jr. | A01K 97/18 269/294 |
| 2,724,207 A | * | 11/1955 | Miller | A01K 97/18 43/53.5 |
| 2,736,126 A | | 2/1956 | Mathews | |
| 2,781,599 A | * | 2/1957 | Steiner | A01K 97/18 43/53.5 |
| 3,001,320 A | * | 9/1961 | Sonner, Jr. | A01K 97/18 294/103.1 |
| 3,397,479 A | * | 8/1968 | Tyjewski | A01K 93/00 43/44.95 |
| 3,451,157 A | * | 6/1969 | Jones | A01K 97/18 43/53.5 |
| 3,718,938 A | | 3/1973 | Blume | |
| 3,802,110 A | * | 4/1974 | Guillemain | A01K 97/24 43/17.2 |
| 4,127,957 A | * | 12/1978 | Bourquin | A01K 97/18 43/53.5 |
| 4,206,561 A | * | 6/1980 | Wong | A01K 97/18 43/53.5 |
| 4,914,853 A | * | 4/1990 | Swindle | A01K 97/18 43/53.5 |
| 5,138,791 A | * | 8/1992 | Coes | A01K 97/18 43/4 |
| 5,557,874 A | | 9/1996 | Pietrandrea | |

(Continued)

*Primary Examiner* — Christopher P Ellis
*Assistant Examiner* — Michael Wang

(57) ABSTRACT

One embodiment of a portable and convenient fishing tool is structured with multiple fishing related tools integrated into a single apparatus. One elongated member of the embodiment functions as a dual type fishhook removers with an inherent additional capability as a line knot maker. The shank part of the elongated member is mounted to a handle that carries a line clipper tool and a hook sharpener.

1 Claim, 7 Drawing Sheets

(56) References Cited

U.S. PATENT DOCUMENTS

| | | | | |
|---|---|---|---|---|
| 6,038,807 A * | 3/2000 | Taylor | A01K 97/24 114/221 A |
| 6,045,234 A * | 4/2000 | Leeds | A01K 97/18 362/119 |
| 6,205,698 B1 * | 3/2001 | Richards | A01K 97/18 43/53.5 |
| 6,397,512 B1 * | 6/2002 | Chang | A01K 97/18 43/53.5 |
| 6,397,513 B1 * | 6/2002 | Reed | A01K 97/18 224/251 |
| 6,766,609 B1 * | 7/2004 | Aboczky | A01K 97/14 177/131 |
| 6,840,002 B1 * | 1/2005 | Dick | A01K 97/18 43/53.5 |
| 7,117,630 B1 * | 10/2006 | Messerschmidt | A01K 97/18 43/53.5 |
| 7,407,069 B1 | 8/2008 | Trafas | |
| 7,603,806 B2 * | 10/2009 | Olivier | A01K 97/18 43/53.5 |
| 7,818,914 B1 * | 10/2010 | Baiamonte | A01K 97/18 43/53.5 |
| 7,856,751 B1 * | 12/2010 | Moncrief | A01K 97/00 43/4 |
| 8,381,430 B1 * | 2/2013 | Dougherty | A01K 97/18 43/53.5 |
| 8,539,711 B2 * | 9/2013 | Leuckel | A01K 97/24 43/17.2 |
| 2005/0278865 A1 * | 12/2005 | West | A01K 97/00 7/106 |
| 2008/0163432 A1 * | 7/2008 | Reid | A01K 97/00 7/120 |
| 2008/0301998 A1 * | 12/2008 | Gallo | A01K 97/18 43/53.5 |
| 2009/0229167 A1 * | 9/2009 | Doss | A01K 97/18 43/53.5 |
| 2010/0132243 A1 * | 6/2010 | Dick | A01K 97/18 43/53.5 |

* cited by examiner

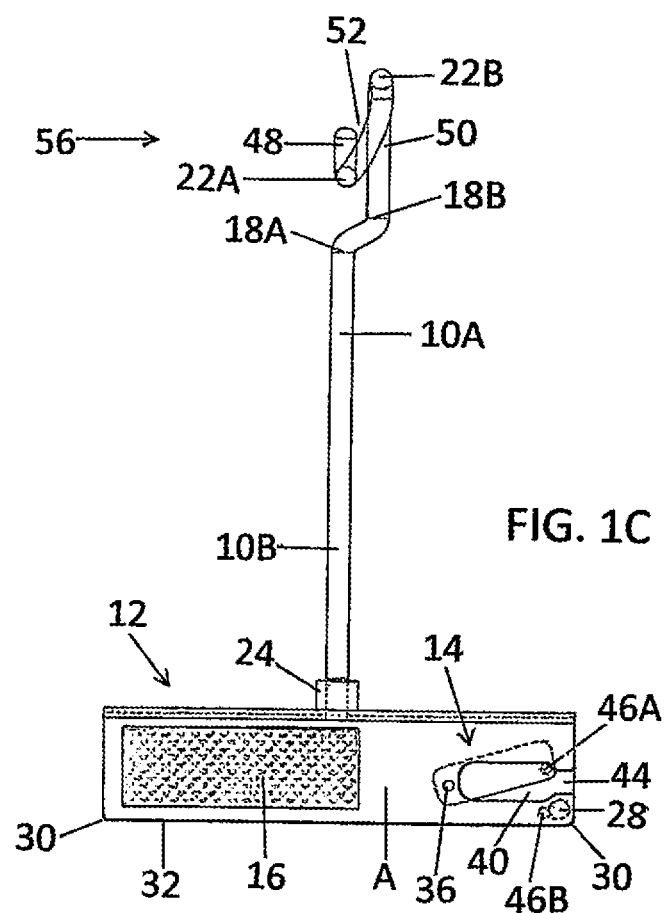

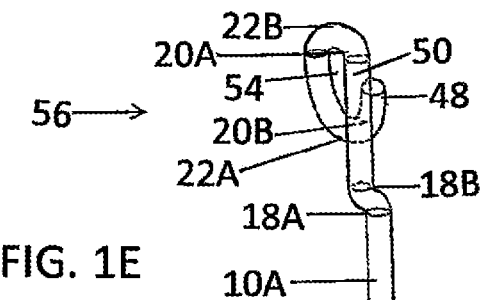
FIG. 1E
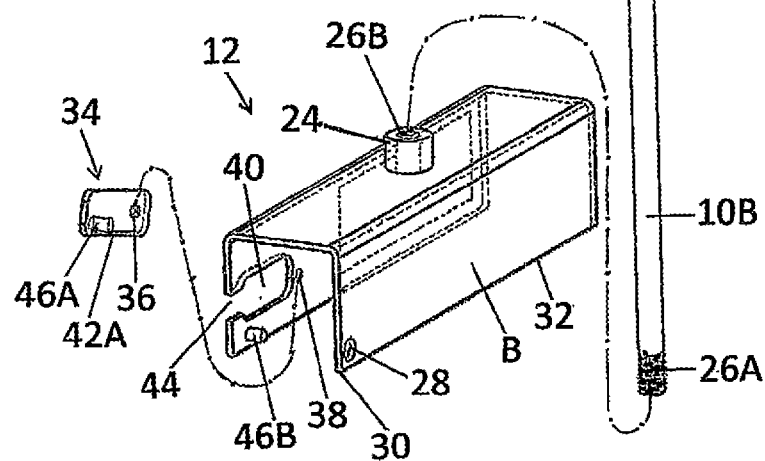
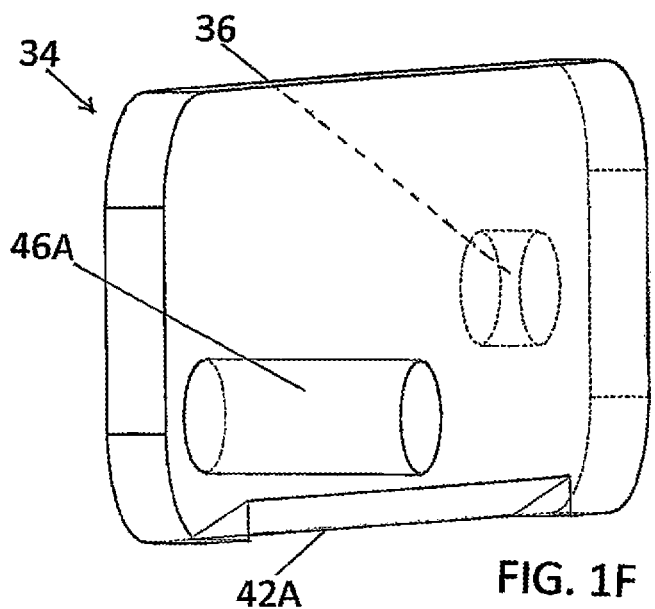
FIG. 1F

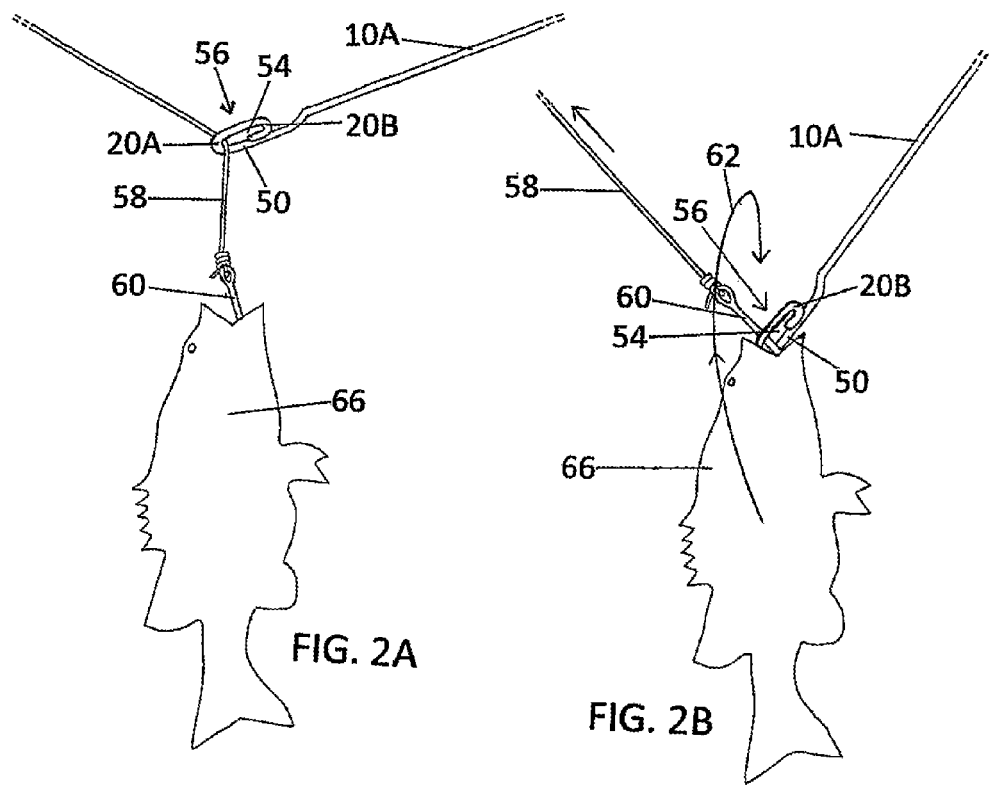
FIG. 2A
FIG. 2B
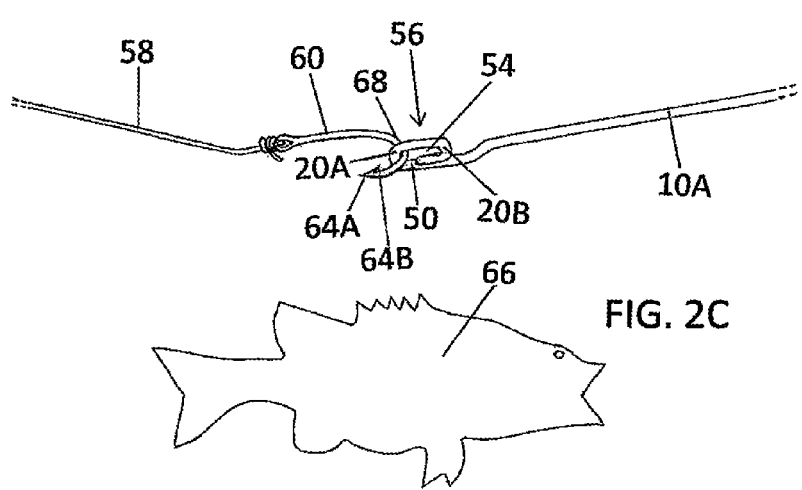
FIG. 2C

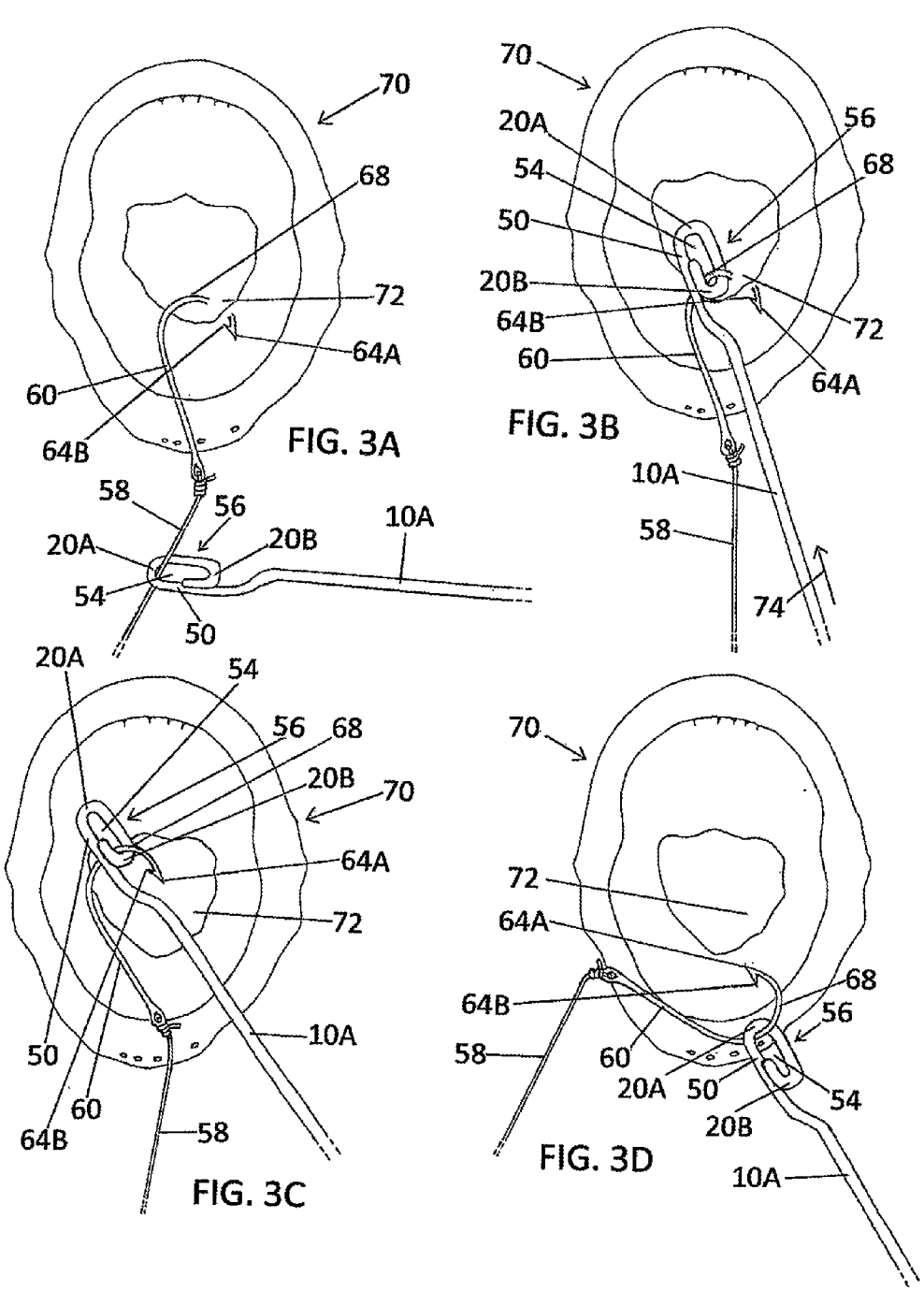

MULTI-FUNCTION INTEGRAL FISHING TOOL WITH DUAL FISHHOOK REMOVERS, LINE KNOT MAKER, LINE CLIPPER AND HOOK SHARPENER

BACKGROUND

Prior Art

The following is a list of prior art that appears relevant:
Patent number Kind code U.S. patents issue date Patentee(s)
7856751 B1 2010-12-28 Moncrief
7818914 B1 2010-10-26 Baiamonte, Wegner
7407069 B1 2008-08-05 Trafas
6205698 B1 2001-03-27 Richards
5557874 A 1996-09-24 Pietrandrea, Saviano
3718938 A 1973-03-06 Blume
2781599 A 1957-02-19 Steiner
2736126 A 1956-02-28 Mathews Handling hooks and lines is an important part of fishing. Hooks are attached to lines using specific techniques in knot making. When a tight and secure knot is made, the protruding end of the line is clipped off using an appropriate tool. Once a fish is caught, an angler is left with the task of removing the hook off the mouth of the fish. With repeated use, hooks need sharpening for proper functioning. The above hook and line related tasks of anglers require skills and tools for each one of them. Originally tools were designed specifically for a single task in fishing. Thereafter, fishing tools were invented with multiple functions though incomplete, inadequate or with less related or random sets of functions. Baiamonte and Wegner, Richards, Steiner, and Mathews invented tools that perform a single basic function, fishhook removal.

Moncrief invented a fishing tool with dual functions, fishhook removal and fish bladder venting. These two functions, though related, the tool has its major shortcoming not being capable of any other task related to fishing hook or line. The multiple integral fishing device disclosed by Trafas has considerable disadvantages even though it comprises four tools. The main body of the device needs to be attached to the waist belt or a loop on a pair of pants/shorts of the angler to retain a fish on the stringer in water. This application is useful only in specific types of fishing activities such as fly fishing. The tools in this device have diverse functions rather than for converged, more closely related tasks. The device invented by Pietrandrea and Saviano only has dual functionality. It has knot tying and line cutting applications specifically for fly fishing. The combined tool device disclosed by Blume has limited applications of sharpening knives and hooks, and dehooking with a possible third application of holding a fish while scaling it.

SUMMARY

The present invention comprises dual type fishhook removers with an inherent capability as a line knot maker, integrated with a line clipper and hook sharpener:

According to one embodiment, the fishhook removing portion comprises a shaft with terminal loops capable of multiple applications in dehooking a fish, and the preferred embodiment can also serve as a line knot making tool.

In accordance with another embodiment the handle portion that attaches the shaft, comprises a line clipper, and a hook sharpener. The present invention is heavy-duty, effective, and universally applicable under various fishing environments.

Advantages

In accordance with the embodiments several advantages of one or more aspects are: an integrated fishing apparatus where several fishing tool functions are combined in a single portable piece. In addition to the multiple dehooking functions with different methods of use, convergence of included other applications accomplishes an essential set of closely related tasks. The present invention allows for easy portability, practicality, convenience, and convergence of multiple tools all in a single hand-held apparatus. Further features and advantages of one or more aspects will be apparent from the accompanying drawings and ensuing description.

DRAWINGS

Figures

In the accompanying drawings, closely related figures have the same number but different suffixes. Like elements are assigned like reference characters. The drawings are not necessarily to scale, and are only for the purpose of illustrating one or more embodiments of the invention including their principles and are in no way limiting the invention. A brief description of the drawings is as follows:

FIGS. 1A to 1F show various views and aspects of a multifunctional fishing tool with dehooking devices, knot maker, line clipper, and hook sharpener.

FIGS. 2A to 2C show various steps in the operation of the swing and flip method of unhooking a fish.

FIGS. 3A to 3D show various steps in the operation of the push and withdrawal method of unhooking a fish.

DRAWINGS

Figure 1A:
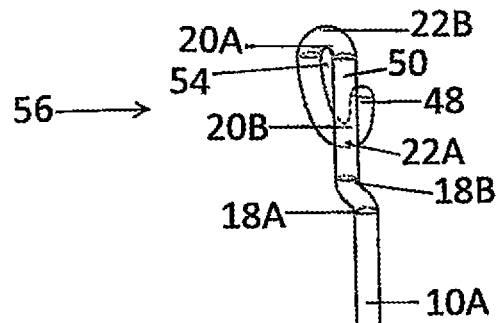
Figure 1B:
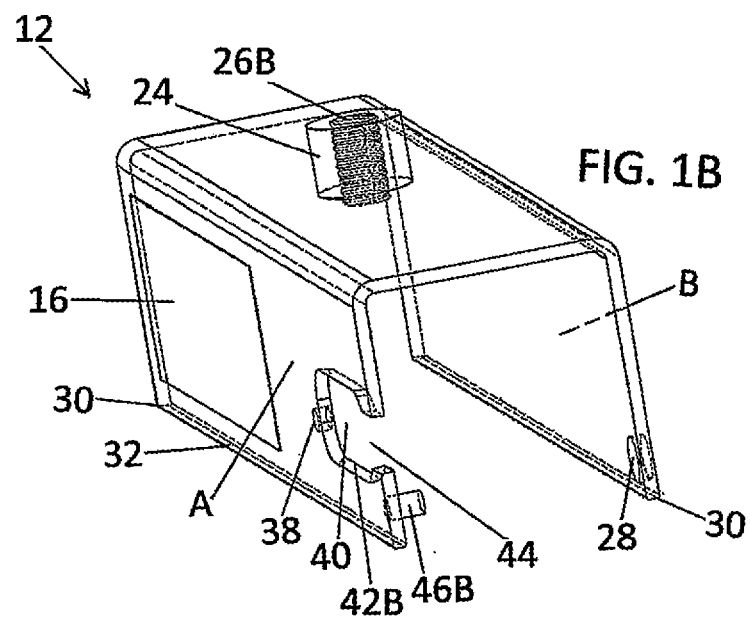

Reference Characters 10A shaft
10B shank part of shaft
12 handle
14 line clipper
16 hook sharpener
18A lower bend on shaft
18B upper bend on shaft
20A downward loop of shaft
20B upward loop of shaft
22A lower end of upward loop
22B terminal end of downward loop
24 disk on handle to mount shaft
26A threaded end of shaft
26B female thread hole on disk
A side A of handle
B side B of handle
28 circular hole on side B of handle
30 rounded corners of handle
32 rounded edges of handle
34 cutting arm
36 pivot to mount cutting arm
38 cutting arm pivot hole on handle wall
40 cutting space 42A cutting edge on the arm
42B cutting edge on handle wall
44 opening leading to cutting space
46A peg on cutting arm
46B peg to rest cutting arm
48 terminal arm of upward loop
50 terminal straight arm between loops
52 gap between terminal arm and straight arm
54 space between the two loops
56 fishhook removers
58 fishing line
60 fishing hook
62 arrow showing the orbit in swing and flip method
64A sharp end of hook
64B barb on fishing hook
66 a fish—specimen
68 curved part of hook
70 open mouth of the fish
72 buccal tissue of the fish
74 arrow showing direction that the shaft was pushed in
76 eye of hook
78A terminal part of line
78B longer part of line
80A left forefinger and thumb
80B right forefinger and thumb
82 direction of rotation of shaft shown by arrow
84A wraps on the line
84B first wrap on the line
84C large loop on the line
86 strong pull on longer part of line shown by arrow
88 line knot
90 base portion of surplus terminal part of line after clipping

DETAILED DESCRIPTION OF EMBODIMENTS OF THE INVENTION

The preferred embodiments of the invention are illustrated in FIGS. 1A-F. The preferred embodiments comprise multi-modal fishhook removers with an inherent capability for line knot making, and two additional fishing tools. The fishhook removers preferably comprise a rigid, solid shaft 10A firmly mounted to a rigid hollow handle 12. The preferred embodiment of the handle 12 comprises a fishing line clipper 14, and a hook sharpener 16. The embodiment of the shaft 10A comprises multiple bends 18A and 18B and loops 20A and 20B structured in a specific manner (FIGS. 1A, 1C, 1D, and 1E), allowing the embodiment to function as multi-modal fishhook removers and a fishing line knot maker. The preferred embodiments of the present invention are preferably made of a non-corrosive, rigid material of sufficient strength and temper to withstand the stresses and strains in the purposes served.

In the configuration depicted in FIGS. 1A-1E, the handle 12 is an elongated, rectangular, hollow structure with both ends and one longitudinal side are open, onto the middle longitudinal side (in the middle) is affixed a cylindrical disk 24 onto which the shaft 10A together with its loops 20A and 20B, and bends 18A and 186 (all being a single continuous, cylindrical structural element having a uniform outer diameter measure throughout its entire structure) is releasably thread-mounted. The mounting end of the shaft is threaded 26A in order to screw it into a female thread-hole 26B on the disk 24.

Figure 1D:
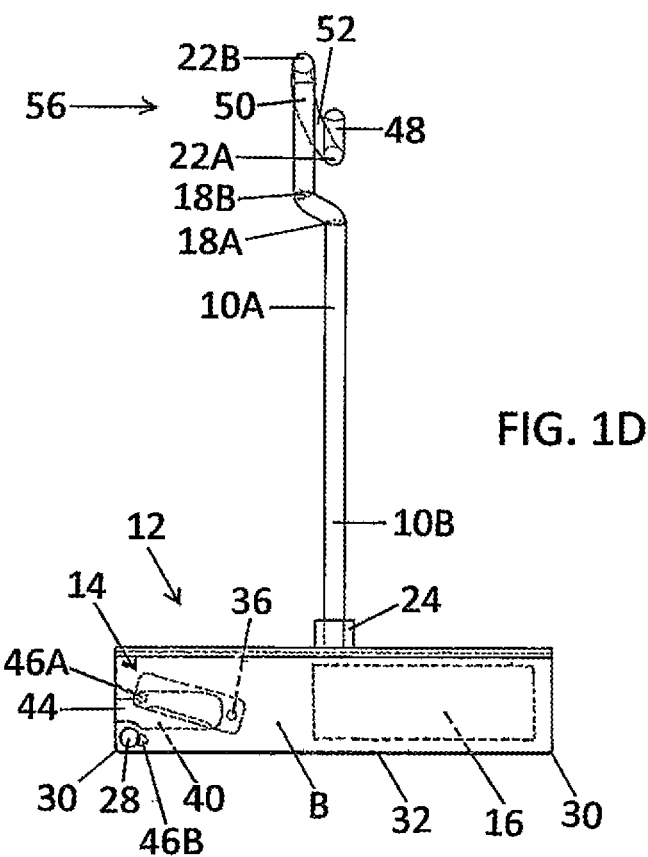

As illustrated in FIGS. 1A, 1C and 1D, the handle 12 comprises a fishing line clipper 14 on one end of side A with reference A, the other end of the same side being structured to have a hook sharpener 16. The other side B with reference B of the handle as shown in FIGS. 1A-1E has a circular hole 28 on one end for safe attachment of the tool to the body of a fisherman if needed. The corners 30 and edges 32 of the material that make up the handle are rounded off to prevent any sharp edges that can be hazardous when handling. The thickness of the preferred stainless steel sheet material that makes up the handle may be 1.0-1.3 mm. The length, width and height of the handle may vary as needed. The embodiment of the shaft is also preferably made of stainless steel and is solid and cylindrical with a diameter of 2-5 mm.

The cutting arm 34 of the fishing line clipper 14 is mounted firmly with a pivot 36 onto a pivot hole 38 on the handle wall to affix it flat and slidable on the inner surface next to the cutting space 40 thereby the flat cutting arm is enclosed by the handle wall (FIGS. 1A, 1C-1E). The cutting arm 34 that functions like one blade of a pair of scissors with similar slanted cutting edge 42A, can be moved up and down across the cutting space 40. The cutting space 40, may have an optional opening 44 at the end of the handle for easy insertion of the fishing line for cutting. The lower margin of the cutting space 40 has a cutting edge 42B similar to that of the cutting arm 34. The cutting arm 34 is provided with a rigid, sufficiently strong and durable peg 46A for finger operation in an up and down motion. As illustrated, in FIGS. 1A-1E, the cutting arm 34 may rest on an optional peg 46B mounted on the inside of the handle wall (FIGS. 1A, 1C, 1D and 1E).

The surface of the hook sharpener 16 depicted in FIG. 1C is integrated as part of the handle wall element, on the outer surface of the first longitudinal side A of handle wall and it resembles the surface of small files used in sharpening tools. The length and width of the hook sharpener 16 may vary.

The embodiment of the shaft 10A is constructed with bends 18A and 18B and loops 20A and 20B as illustrated (FIGS. 1A, 1C, 1D and 1E). The shaft has a downward loop 20A, and an upward loop 20B at the terminal end with offset and an elongated elliptical space 54 in between the two loops 20A and 20B (FIGS. 1A, 1C-1E). The terminal arm 48 of the upward loop 20B is structured in such a way that it stays at a distance of about 2-4 mm from the terminal straight arm 50 of the shaft thereby leaving a gap 52 for the fishing line to gain access to the space 54 enclosed by the two loops 20A and 20B. The lower end 22A of the upward loop is about 8-15 mm from the upper bend 18B. The elliptical space 54 enclosed by the two loops (see FIGS. 1A and 1E) may have varied dimensions. The length of the embodiment of the shaft 10A from the point where it is attached to the handle 12 up to the terminal end 22B of the downward loop 20A may vary from 4 to 12 inches. The threading 26A on the shaft allows for easy installation of various length replacement shafts as needed.

Further Advantages

From the illustrations, descriptions and operational details provided herein, a number of advantages of some embodiments of our present invention become evident:
  a) The multiple fishing tools in the present invention with convergence of functions to perform a closely related set of tasks are designed to act synergistically.
  b) The assembly of such closely related fishing tools is a unique blend, compact, easily portable, and convenient for immediate use. Multiple pieces of tools can be unorganized and difficult to find when needed.
  c) Fishing hook and line related tasks are foremost in fishing. Combining the tools needed to handle these two major components in a single hand-held apparatus is an obvious advantage compared to a combination of less related tools into a single unit as seen in some prior art.

d) The preferred material used in the present invention is selected for corrosion resistance, rigidity, strength to withstand the stress and strain in its utility, and heavy-duty construction. These features make the present invention durable and valuable.

e) The screw-on type of shaft mounting capability to the handle allows easy switching of shafts of varied lengths as needed for different fishing environments.

f) The hook removal embodiment capable of at least two different methods of unhooking a fish provides fishermen the choice, another great advantage.

g) The suitability of the present invention to be used by both sport fishermen and professionals is an added advantage.

h) The fact that the hook removers of the present invention is also capable of functioning as a quick fishing line knot maker is of considerable advantage particularly to fly fishermen.

i) The built-in scissor type line clipper can help in completing the knot making process by clipping off the surplus terminal piece of line. The clipper is easy to use, effective, and accessible when needed.

j) The hook sharpener, another important hook-related tool is handy and is blended with other closely related fishing tools in this unique apparatus.

Scope

Even though several embodiments of the present invention have been illustrated and described, it is recognized that other variations are possible as regards to features, components, material and configurations. Those skilled in the art will recognize that modifications, alterations, additions, and/or deletions may be made to the currently preferred embodiments without departing from the spirit and scope of the invention. Accordingly, the scope of the embodiments should be determined by the appended claims and their legal equivalents, rather than by the illustrations, descriptions and examples provided herein.

Operation: Fishhook Removers—FIGS. 1A, 1C, 1D, 1E, 2A-C, 3A-D

A) Swing and Flip Method of Fishhook Removal—FIG. 1A, 1C, 1D, 1E, 2A-C

When a fish 66 is caught with the hook stuck in its mouth, the fish is brought out of water by grabbing the line. The fisherman (right handed—cited here) holds the line 58 in his left hand and engages the line 58 about 7-10 inches above the hook 60 using the fishhook removers 56 in his right hand to get the line 58 inserted into the space 54 between the two loops 20A and 20B via the gap 52 between the terminal arm 48 and the straight arm 50 (FIG. 2A). Holding tight on the handle 12 of the hook removers and pulling on the line 58 (see FIGS. 2A and 2B), the hook remover loops 20A and 20B are moved along the line 58 downwards (FIGS. 2A and 2B) so that the terminal end 22B gets inserted into the mouth of the fish 66 as shown in FIG. 2B, and finally engaging the hook 60 tightly. At this point, the end of the loop 22B of the hook removers tightly grips onto the curved part 68 of the hook that is inside the mouth of the fish. The orientation of the hook removers 56 and the hook 60 at this point in time is illustrated in FIG. 2B. In this position, while tightly holding onto the line and the handle of the device as in FIG. 2B, the user swings and twirls the hooked fish 66 in an orbit 62 directly in front of the chest of the user as shown (see FIG. 2B). During this swinging and twirling to flip the fish in an orbit 62 as shown, the fish is carried between the user's outstretched arms, and swings up in the 12 O'clock position at the top of this action. The hook becomes dislodged in about a 5 O'clock position as the fish falls. The fish 66 is now freed from the hook.

This swing and flip method of hook removal has several advantages of its own even though it is mostly suited for small and medium sized fishes. In this method, the fisherman need not handle the fish directly. It is quick, and it can be used to release a fish back into water, or on land or a vessel to save the fish. Directly handling a fish can have hazards from spines on fins, and teeth in the mouth of the fish. Fishes that are released back into water by this method go back with their slimy surface film intact, allowing a better chance for survival.

When the fish is released from the hook by the swing and flip method, the unhooking occurs due to gravitational force on the fish when the hook is held high by the taut line 58 and the terminal downward loop 20A of the device during the swing as shown in FIG. 2B. At the time the release occurs, the pull on the hook by the terminal downward loop 20A of the hook removers makes the hook 60 engaged onto its curved part 68. When the fish drops down with the line 58 taut and the hook remover pulling the hook, the released hook 60 instantly comes out of the mouth of the fish, safely with the sharp end 64A of the hook pointing backwards and the barb 64B right behind the smooth and curved part 68 of the hook (see FIG. 2C). Such an occurrence prevents the hook from re-hooking the buccal tissue of the fish. It is the terminal downward loop 20A of the device that is essentially effective in this method of hook removal.

B) Push and Withdrawal Method of Fishhook Removal—FIGS. 1A, 1C, 1D, 1E, 3A-D

This method is useful and preferred for relatively large fish and/or a fish that is hooked deep in the mouth. Both loops 20A and 20B of the hook removers 56 are effective in this method as explained below. When a fish is caught and brought out of water, the fisherman opens the mouth 70 of the fish using his left hand while holding the line. Holding the handle 12 of the hook removers in his right hand, the user engages the line 58 with the device as in FIG. 3A about 3-5 inches from the hook 60 so that the line 58 securely slips into the space 54 between loops via the gap 52 (FIGS. 1A, 1C, 1D and 3A). He then moves the loop end of the fishhook removers 56 along the line 58 to reach the curved part 68 of the hook in the mouth of the fish (FIG. 3B). The user engages the curved part 68 of the hook with the upward loop 20B of the device (see FIG. 3B). Once engaged as in FIG. 3B, the user pushes 74 the hook deep into the mouth 70 of the fish to release it from the buccal tissue 72 of the fish where it was stuck (FIGS. 3A and 3B). Once the hook is off the tissue as in FIG. 3C, the user quickly pulls and withdraws the hook 60 as shown in FIG. 3D. The effective part in the withdrawal process is the terminal downward loop 20A of the device (FIG. 3D). The sharp end 64A of the hook automatically turns backwards when pulled on the curved part 68, allowing safe and quick removal of the hook off the mouth of the fish without any chance of reengaging the buccal tissue (FIG. 3D).

Operation: Fishing Line Knot Maker—FIG. 1A, 1E, 4A-D

Figure 4A:
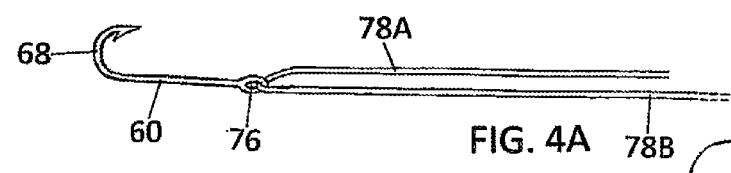
FIGS. 4A to 4D depict various steps that the present invention enables to efficiently tie a knot to a hook.
Figure 4B:
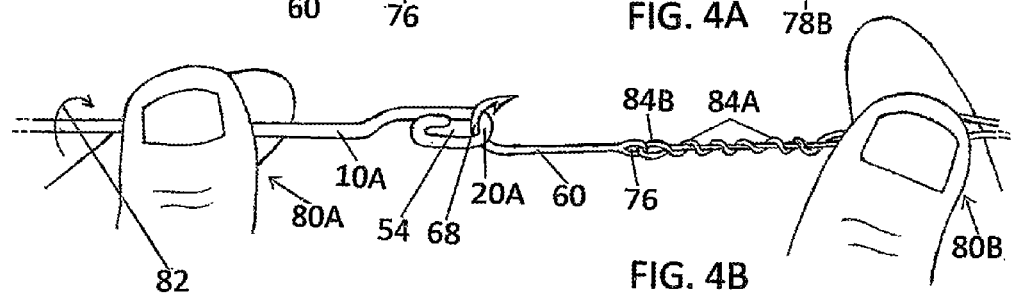

The fishhook removers 56 of the present invention (FIGS. 1A, 1E and 4B) can also serve as a fishing line knot maker as illustrated in FIGS. 4A-4D. During this process, the user first inserts the end of the fishing line through the eye 76 of the fishing hook 60 and passes about 6-10 inches of the terminal part 78A of the line through the eye 76 as in FIG. 4A. With the left forefinger and thumb 80A, the user picks up the device by the shank part 10B of the shaft as shown in FIG. 4B. The hook 60 with the fishing line inserted through its eye 76 (FIG. 4A) is now picked up with the right forefinger and thumb 80B (FIG. 4B). The curved part 68 of the hook is positioned to engage onto the terminal downward loop 20A of the device (FIG. 4B). Once the hook is engaged, the shaft 10A of the device held between the left forefinger and thumb 80A is rotated as shown by the arrow 82 on its axis by moving the thumb upwards and the forefinger downwards (FIG. 4B).

Figure 4C:
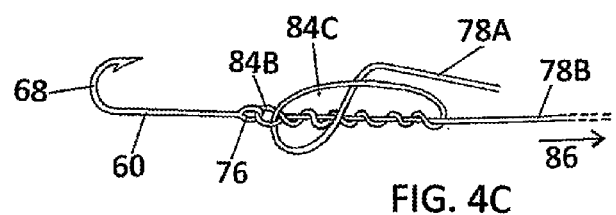
Figure 4D:
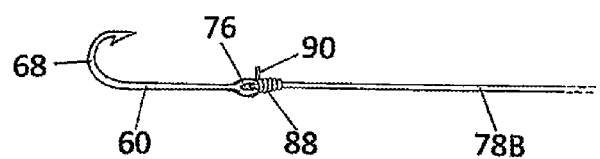

The rotational momentum created on the axis of the shaft 10A causes the engaged hook 60 to rotate with it. When the right forefinger and thumb 80B steadily hold the two parts 78A and 78B of the line about 2-3 inches from the eye of the hook as illustrated in FIG. 4B while the hook rotates, the less tight terminal part of the line 78A wraps or loops around the longer part 78B of the line as shown in FIG. 4B. When 5-6 wraps 84A are formed, the user carefully takes the terminal part 78A of the line and inserts the end through the first wrap 84B, and again through the large loop 84C that is created as illustrated in FIG. 4C. The terminal part 78A of the line is then sufficiently drawn out. While holding the curved part 68 of the hook tight between the left forefinger and thumb 80A or while engaging the curved part 68 of the hook on the terminal downward loop 20A of the device as before, the longer part 78B of the fishing line is pulled 86 with the right forefinger and thumb to bring the wraps 84A and 84B together to form the knot 88. This action tightens the wraps 84A and 84B well thereby creating a quick, strong knot 88 (FIG. 4D). The surplus end portion of the line is then clipped off using the line clipper of this present invention, leaving just a short base portion 90.

Even though an improved clinch knot is illustrated by FIGS. 4A-D, other knot types may be formed using this device. The kind of hook illustrated in FIGS. 4A-D is a conventional fishing hook. However this device can also be used to tie knots on other kinds of fishing hooks such as double and treble hooks.

Operation: Fishing Line Clipper—FIGS. 1A-E

As illustrated by FIGS. 1A, 1C, 1D and 1E, the fishing line clipper 14 is located at one end of side A with reference A of the handle 12 of the present invention. The cutting arm 34 of the clipper is mounted on the inner surface of the handle wall as shown in FIGS. 1A, 1C, 1D and 1E. The line clipper functions like a pair of scissors with similar slanted cutting edges 42A and 42B, one cutting edge 42A on the cutting arm and the other cutting edge 42B at the bottom of the cutting space 40 on the wall of the handle 12. The cutting arm 34 moves on a pivot 36 and the cutting edges 42A and 42B are structured to slide against each other. The cutting space 40 opens at the end of the handle as shown in FIG. 1A-E. This opening 44 is of sufficient dimension to allow fishing lines to be inserted into the cutting space 40. The cutting arm 34 is mounted with a peg 46A to move it up and down. In the closed position when the cutting arm 34 stays low, it may rest on a peg 46B that is mounted on the wall of the handle on the inner side (FIGS. 1A-E). When a user wants to clip a fishing line, he opens the cutting space 40 by raising the cutting arm 34 pushing up on the peg 46A with a finger, and inserts the line into the cutting space 40 via the opening 44 or directly into the cutting space 40. He then positions the line so that the cutting edge 42B becomes aligned with the exact location where the cut should occur. Now with the line in position, the user pulls down on the peg 46A of the cutting arm with a finger to forcibly bring down the cutting arm 34 against the fishing line that sits on the cutting edge 42B.

Since the cutting arm is mounted in such a position for the two cutting edges 42A and 42B to slide and cross passing each other as in a pair of scissors, the above operation easily cuts/clips the fishing line positioned in the cutting space 40. After cutting the line the cutting arm 34 rests on the peg 46B, bringing the line clipper to a closed position.

Operation: Hook Sharpener—FIGS. 1A-E

The hook sharpener 16 is oriented on the outer surface of side A of the handle 12 as illustrated in FIGS. 1A-E. The surface of the hook sharpener 16 is structured similar to the surface of a small sharpening file. The sharpening surface is rough, abrasive, and is resistant to wear due to the material selected.

When a user wants to sharpen the tip of a fishing hook, he places the side of the tip of the hook on the sharpener surface and applies pressure (similar to sharpening a knife) and moves it back and forth along the length of the rough surface. This action grinds the side of the tip that is in contact with the surface of the sharpener 16. By grinding the side of the tip sufficiently while rotating the tip to vary the side of contact, the user is left with the result of a sharpened hook.

We claim:

1. A multi-function, portable, heavy duty, fishing tool, comprising:

a solid, elongated, uniformly cylindrical shaft having a proximal end and a terminal end, a male thread on the proximal end, and multiple bends and loops on the terminal end, the cylindrical shaft being mounted perpendicularly on a generally rectangular, hollow, open-ended, elongated handle having a metallic wall, said metallic handle wall comprising contiguous first, second and third longitudinal sides, said second longitudinal side comprising a cylindrical disk having a female thread hold being affixed generally in the middle for threaded attachment of said shaft;

the terminal end of said cylindrical shaft being adapted to have a downward loop and an upward loop with an offset and a generally elongated elliptical space between said loops, said loops with the offset and elliptical space being components of dual fishhook removal tools which can also function as a knot maker, said fishhook removal tools providing for at least two methods of fishhook removal, said knot maker accommodating various types of fishhooks for knot making, said cylindrical shaft together with said loops and bends being a single structural element having a generally uniform outer diameter measure;

said first longitudinal side of said handle wall comprising a scissor mechanism of a fishing line clipper oriented inwards, the outer surface of said first longitudinal side comprising a sharpening surface of a hook sharpener, said sharpening surface being constructed as an integral part of the handle wall element, said third longitudinal side of the handle wall, on one end comprising a circular hold to aid in portability of said fishing tool, said fishing tool being constructed using a rigid, strong, and durable material resistant to corrosion;

said scissor mechanism comprising a movable, flat, cutting arm having a first cutting edge, a second cutting edge on the first longitudinal side of the handle wall, one end of said cutting arm being pivotally fastened at a predetermined location on said first longitudinal side to orient said cutting arm flatly and slidably on the inner surface, said first and second cutting edges functioning like cutting edges of a pair of scissors, a peg mounted on the free end of said cutting arm aiding in finger operation of the cutting arm slidably up and down on the handle wall, said handle wall enclosing said cutting arm;

said first longitudinal side further comprising a cutting space oriented above said second cutting edge, said second cutting edge being a margin of said cutting space, said cutting space opening when said cutting arm is moved up with a finger on the peg to insert a fishing line into said cutting space for cutting, the open end of said handle adjacent to said cutting arm allowing access for finger operation of said cutting arm.

\* \* \* \* \*